June 6, 1972    R. W. CARP ET AL    3,667,812
SKID CONTROL SYSTEM CYCLING AND CHECKING CIRCUIT, INCLUDING
DRIFT PREVENTION MEANS Filed Dec. 7, 1970    2 Sheets-Sheet 1

INVENTORS
RALPH W. CARP
FREDERICK O. MIESTERFELD
BY
William G. Christoforo
ATTORNEY

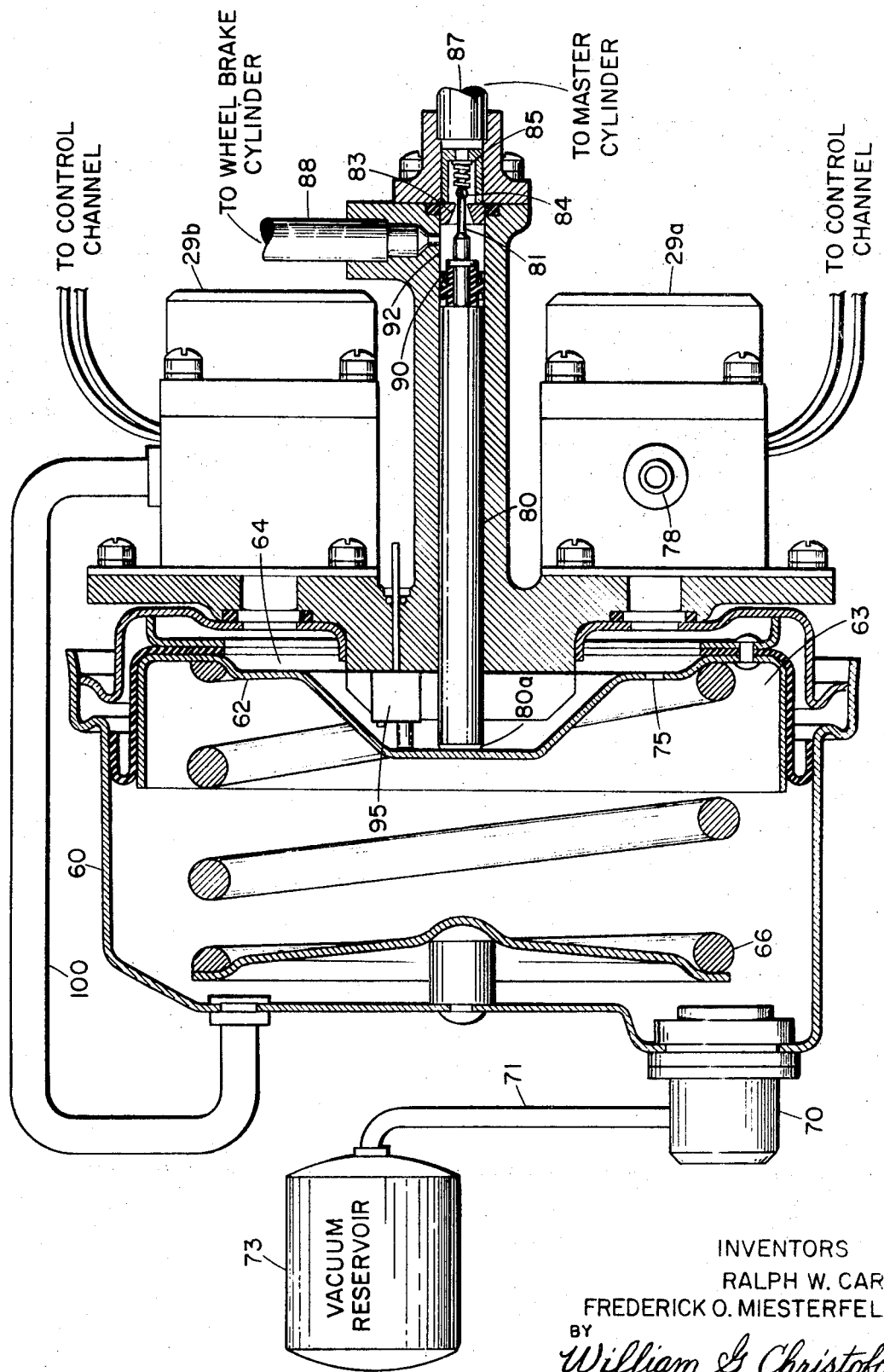

United States Patent Office 3,667,812
Patented June 6, 1972

3,667,812
SKID CONTROL SYSTEM CYCLING AND CHECKING CIRCUIT, INCLUDING DRIFT PREVENTION MEANS
Ralph W. Carp, Baltimore, and Frederick O. Miesterfeld, Joppa, Md., assignors to The Bendix Corporation
Filed Dec. 7, 1970, Ser. No. 95,650
Int. Cl. B60t 8/06
U.S. Cl. 303—21 AF                                17 Claims

ABSTRACT OF THE DISCLOSURE

A skid control system includes at least a single control channel and a brake pressure modulating valve. Initial actuation of the system causes a temporary and false control signal to be generated due to initial charging of the control elements. This false control signal is applied to the brake modulator to exercise the modulator. Any movement of the modulator interior parts is sensed by a switch and immediately acts through a drift prevention circuit to extinguish the effect of the false control signal.

BACKGROUND OF THE INVENTION

This invention relates to skid control systems for wheeled vehicles and more particularly to means for cycling the skid control system upon initial actuation of the system and include means for preventing vehicle drift during the cycling period.

In an adaptive braking system for wheeled vehicles and particularly in an automotive adaptive braking system, a brake modulator is provided which normally, i.e., during vehicle stops in which wheel skid is not imminent, does not interfere with operator control of the vehicle brakes. This is accomplished, in adaptive braking systems for use in vehicles having fluid actuated brakes, by interposing in the brake fluid line between the vehicle master cylinder and the wheel brake cylinder a spring biased check valve, biased to isolate the master cylinder from the brake cylinder, but held open by a vacuum diaphragm driven pin. The vacuum diaphragm is spring biased to hold the check valve open but is vacuum driven to permit the check valve to close by a control signal from an adaptive braking system control channel. The control signal is generated by the control channel when wheel skid becomes imminent and thereafter operates to automatically control wheel braking to effect optimum vehicles stopping characteristics. This automatic control of the vehicle brakes includes a period of time immediately after the check valve is closed during which the vehicle brakes are released.

It is desirable that the operator of a vehicle having an adaptive braking system be assured of the operability of the system. Additionally, it has been found that under certain circumstances, the adaptive braking system in a vehicle will be called upon to operate only very infrequently. In other words, certain vehicle operators will only very rarely allow their vehicles to be placed in a situation where braking which produces a skid is required.

It can be understood that one method of assuring the operability of the adaptive braking system is to periodically exercise the entire system regardless of whether the system is actually required to control the vehicle braking. This will not only allow a check of the operability of the system but will also periodically exercise the system, a function which is especially imperative in view of the mechanical nature of the brake pressure modulator.

A convenient and advantageous time to exercise and check the system is during initial start up of the vehicle. The actuation of the ignition switch to start the vehicle can be utilized to introduce a false signal into the control channel. For systems having electronic control channels, the exercise and check of the system at initial vehicle start up is especially advantageous since the ignition switch energizes the electrical system of the vehicle and thus energizes the control channel. Resultant current in-rush into the charge storage elements of the control channel automatically causes a false control signal to be generated if the control channel is operating properly. Thus, this false control signal can be taken as an indication that the control channel is operating properly. The false control signal is applied to the brake pressure modulator to exercise that unit.

One serious problem does result from this exercising. During the time that the brake pressure modulator is being exercised, the vehicle brakes are released. It is possible, if the vehicle parking brake is not set and the vehicle is on a grade, that the vehicle will move during the exercising period if in neutral or will cause the transmission to be jammed if in "parked." This problem is particularly troublesome where adaptive braking is applied to all wheels on the vehicle.

SUMMARY OF THE INVENTION

An adaptive braking system exercising system including a drift prevention circuit has been devised which not only checks the operation of the adaptive braking system but also prevents excessive vehicle motion during exercise of the modulator by sensing initial modulator movement and at that time overriding the control signal which caused the movement to thereby return the modulator immediately to its normal position.

Each or any combination of control channels is equipped with means for sensing the operation of the channel brake pressure modulator. These sensing means will normally provide a switch actuation upon operation of the modulator. The drift prevention circuit is energized when the vehicle power line is energized which, of course, is when the vehicle ignition switch is initially turned on normally to start the vehicle engine. Additionally, ignition switch turn on causes a false control signal to be generated in each channel, or alternately this false control signal may be generated by means specifically provided to generate the false control signal at initial switch turn on. In response to the false control signal each modulator will start to stroke to thereby actuate its sensing means. If a sensing means is actuated while the drift prevention circuit transient conditions prevail the circuit will immediately operate and interrupt the control signals to the modulators.

It is thus an object of this invention to provide means in an adaptive braking system for automatically cycling the system.

It is another object of this invention to provide for an adaptive braking system means for automatically checking the operation of the system.

It is still another object of this invention to provide an adaptive braking system having a brake pressure modulator means for automatically cycling the modulator at times other than when required for adaptive braking control of the vehicle.

It is still one more object of this invention to provide means of the type described with additionally a circuit for preventing the vehicle from drifting during exercising of the brake pressure modulators.

These and other objects of the invention will become apparent in the following description and appended claims of the invention.

BRIEF DESCRIPTION OF THE DRAWINGS

FIG. 3 shows the internal construction of one type of modulator suitable for use with the invention.

DESCRIPTION OF THE PREFERRED EMBODIMENT

Figure 1:
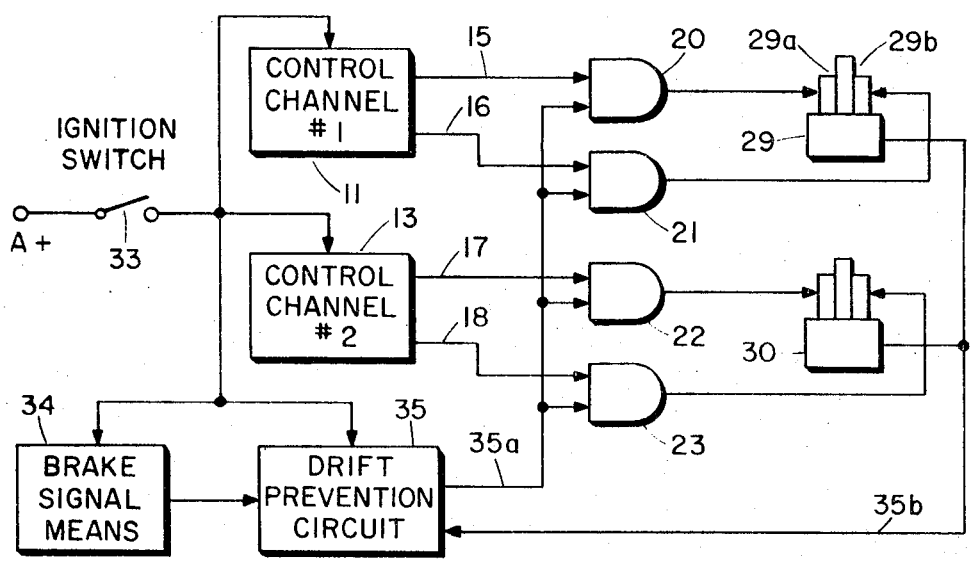
FIG. 1 is a block diagram showing the operation of the invention in one type of adaptive braking system.

Referring first to FIG. 1 there is seen an adaptive braking system comprised generally of the two control channels 11 and 13. These control channels are suitably installed on an automobile, truck and the like. Although, for the sake of illustration, two control channels are shown here it will be made obvious in this description that the invention is applicable for use with a suitable adaptive braking system having any number of control channels. Control signals issue from the control channel on lines 15, 16, 17 and 18 in response to certain vehicle parameters including any one or combination of parameters such as wheel speed, wheel acceleration, vehicle speed, vehicle acceleration, axle loading, etc. as well known to those skilled in the art, these parameters being processed by the control channel. Control signals are applied through gates 20, 21, 22 and 23, respectively to brake pressure modulators 29 and 30 which control the vehicle wheel braking characteristics. The invention will here be described as embodied in an adaptive braking system using vacuum powdered pressure modulator; however, it should be understood that the invention may be practiced in systems using any suitable type of modulator having control signal responsive elements which control the brake pressure, it being merely necessary that a means be provided to sense the response of the modulator to a control signal.

A modulator suitable for use with this invention is shown in FIG. 3, reference to which should now also be made. This modulator includes a generally air tight modulator body 60 which is divided by a flexible diaphram 62 into two chambers, 63 and 64. A spring 66 located within chamber 63 biases diaphragm 62 to the right as seen in the figure. Chamber 73 is connected by a check valve 70 and conduit 71 to a vacuum reservoir 73, suitably the vehicle engine manifold. Thus, at initial turn over of the engine and subsequently thereafter, so long as the engine continues to run, vacuum is drawn from chamber 63 into reservoir 73. Diaphragm 72 is a leaky diaphragm, which fact is illustrated by orifice 75 in the diaphragm, allowing restrictive communication between chambers 63 and 64. A solenoid valve 29a, seen here and also in FIG. 1, receives a control signal from the control channel to permit atmospheric air to enter via port 78 into chamber 64. When atmospheric air enters the modulator chamber 64, diaphragm 62 is forced to the left against the biasing force of spring 66. A displacement rod 80 is normally urged to the right by diaphragm 62 bearing upon rod end 80a. When the diaphgram moves to the left the rod will move to the left due to urging of brake fluid pressure in chamber 92, if any. Rod 80 includes a pin 81 at its right hand end which protrudes through valve seat 83 to lift ball valve 84 therefrom to thus allow free communication between conduits 87 and 88. Conduit 87 is connected to the vehicle master cylinder while conduit 88 is connected to the wheel brake cylinder. Thus, if the vehicle brake pedal is depressed, brake fluid pressure will be transmitted from the vehicle master cylinder via conduit 87 and ball valve 84 to chamber 92, and thence via conduit 88 to the wheel brake cylinders. If at that time diaphragm 62 moves to the left, the fluid pressure will force rod 80 to the left. When rod 80 moves to the left carrying with it pin 81, ball valve 84 will seat against valve seat 83 at the urging of spring 85 to thus isolate conduit 87 from conduit 88. Rod 80 also carries the V packing 90 which defines one end of the generally cylindrical chamber 92, which chamber, as previously mentioned, is in direct communication with conduit 88 and thus with the wheel brake cylinders. The fluid pressure in chamber 92 will continue to force rod 80 to the left as permitted by diaphragm 62, to further increase the volume of that chamber and to thus relieve the pressure in the wheel brake cylinders. A sensing means in the form of switch 95 located within chamber 64 senses any movement of diaphragm 62. Operation of switch 95 will be conveyed to the drift prevention circuit of FIG. 1 and acted upon if that circuit is undergoing its transient turn-on conditions. Otherwise, the actuation of switch 95 will be disregarded as will be fully explained below.

Other means for sensing operation or impending operation of the modulator and which, among other means not mentioned, are suitable for use with the invention include means sensing the arrival of a control signal at solenoid valve 29a, such as a relay, or a pressure switch installed in line 88 to sense the decrease of fluid pressure there resulting from actuation of the displacement rod.

Certain known fluid brake pressure modulators have the displacement rod attached to the diaphragm so that the rod will move in either direction at the urging of the diaphragm. In this case, the rod along with the diaphragm will be exercised regardless of whether there is fluid pressure above the displacement rod such as in chamber 92. It should be obvious that the invention is equally applicable for use with modulators of this latter type as well as other types of modulators not mentioned here.

At the extinguishment of the control signal to solenoid 29a, that solenoid closes to thus shut off communication of chamber 64 with atmospheric air. The pressurized air in chamber 64 which previous to this time had been supplied by solenoid valve 29a at faster rate than can leak through hole 75 now commences to be depleted by this leak so that the pressure in chamber 64 reduces and diaphragm 62 returns to the right under the urging of spring 66.

A second solenoid valve 29b, seen here and also in FIG. 1, provides, when open, direct communication via conduit 100 between chambers 63 and 64. Solenoid valve 29b is maintained normally open to provide such communication and is energized to close by a signal from the control channel, for example, the signal on line 16 from control channel 11 of FIG. 1. Normally, that is when adaptive braking is not required, solenoid valve 29b is unenergized to permit direct communication between chambers 63 and 64. When control channel 11, for example, generates a control signal this includes a signal at both lines 15 and 16. If gates 20 and 21 of FIG. 1 are now open these signals will simultaneously cause solenoid valve 29a to open and solenoid valve 29b to close. When the signal on line 15 is now extinguished, the signal on line 16 will remain on, normally until the brake is released. However, after solenoid valve 29a has operated to reduce braking pressure and subsequently deenergized to allow braking pressure to be slowly restored to the wheel cylinders, if certain vehicle and wheel sensors of the type known to those skilled in the art determine that wheel braking pressure is not being restored rapidly enough, the control channel will interrupt the signal on line 16 to solenoid valve 29b to allow it to open and permit direct communication between chambers 63 and 64. Under these conditions, the air pressure in chamber 64 can now more rapidly move into chamber 63 to thus permit diaphragm 62 to move more rapidly to the right. As displacement rod 80 now moves more rapidly to the right fluid pressure is rapidly restored to the wheel brake cylinders.

Normally, control channel 11 and control channel 13 operate independently of one another thus the above description of the operation of control channel 11 will be equally applicable to the operation of control channel 13 and the operation of that control channel need not be described further at this time.

The drift prevention circuit 35, during normal operation of the vehicle, will generate a gate qualifying signal to gates 20, 21, 22 and 23 whenever brake switch signal is received from brake switch means 34. This means suitably includes the brake switch which is ganged to the operator controlled brake pedal and will close whenever the brake pedal is depressed. If only the brake switch is included the drift prevention circuit will generate a gate qualifying signal only if the vehicle brake pedal is depressed. Brake signal means can, at the option of the system designer, include in addition to the brake switch, a means for generating a false brake signal simultaneously with the false control signal. This latter means conveniently takes the form of a one-shot triggered to generate the false signal when the ignition switch is closed. In this case the drift prevention circuit will generate a gate qualifying signal if the brake pedal is depressed or for some predetermined time period after the ignition is switched on.

The operation of the device of FIG. 1 is as described below when the ignition switch 33 is first closed, assuming at that time the brake switch signal is generated either due to depression of the brake pedal by the vehicle operator or due to ignition switch closing. Upon the closing of ignition switch 33 current from an A+ voltage source, not shown, in-rushes into control channels 11 and 13 and into drift prevention circuit 35. This in-rush of current into the charge storage elements of the control channel causes a temporary and false control signal to be generated. In addition, the in-rush of current into the drift prevention circuit coupled with the generation of the brake switch signal causes a gate qualifying signal to be generated along 35a to qualify gates 20 to 23. Accordingly, the control signal proceeds through gate 20 to solenoid 29a to thereby cause modulator 29 to begin to strobe. Also, the control signal proceeds through gate 22 to effect exercising of modulator 30. Switch 95 senses movement of the modulator diaphragm and transmits this information via line 35b to the drift prevention circuit 35 which thereupon extinguishes the gate qualifying signal at line 35a to cause gates 20 to 23 to close. Solenoid 29a of modulator 29 is thus deenergized along with the corresponding solenoid valve of modulator 30. Additionally, the closing of gates 21 and 23 causes their output signal to be extinguished to thereby cause the opening of solenoid valve 29b and the corresponding solenoid valve of modulator 30. Thus, the solenoid shunting the modulator diaphragm is now opened to cause the diaphragm to move back more rapidly to its normal position.

In certain adaptive braking systems the brake pressure modulator may not be equipped with a shunting solenoid 29b. In this case it should be obvious that the modulator diaphragm will return to its normal position slightly slower. However, the basic principles of the invention remain the same and the invention may be practiced in this latter type adaptive braking system.

Figure 2:
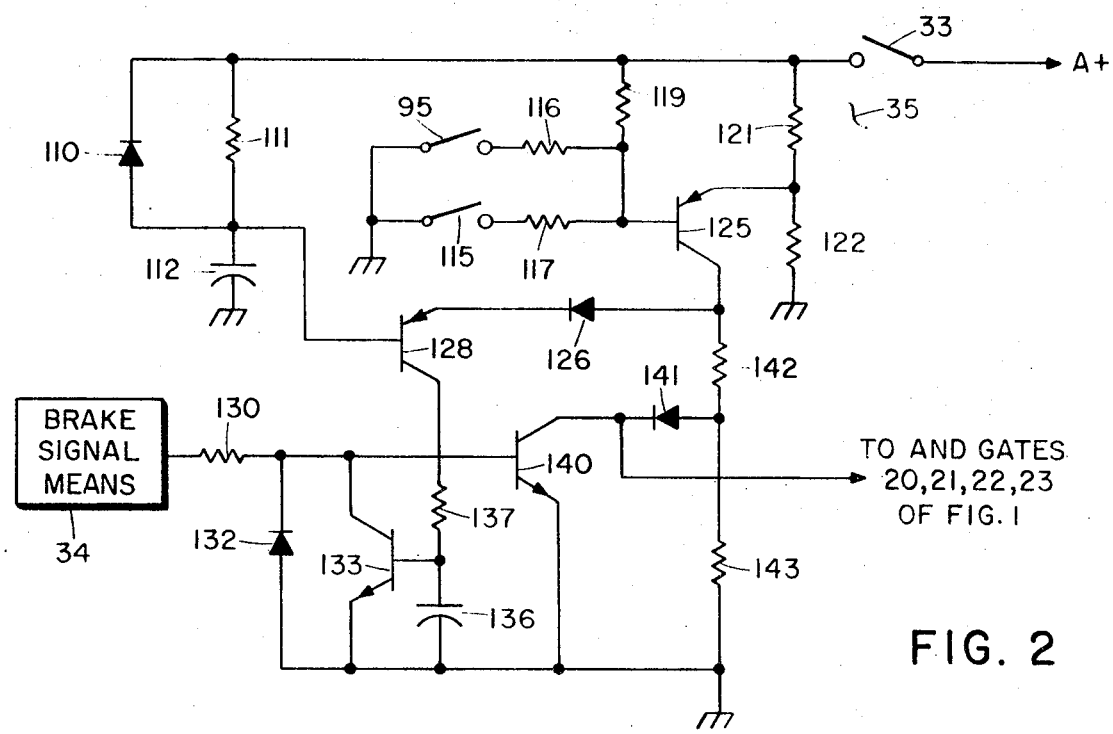
FIG. 2 is a schematic of the invention.

Refer now to FIG. 2 which is a schematic diagram of the drift prevention circuit 35 seen in FIG. 1. In this figure, the ignition switch 33 and brake signal means 34 of FIG. 1 are also seen. The operation of the circuit is as follows, assuming that initially ignition switch 33 is open and brake signal is generated. Positive voltage is applied from the brake signal means through resistor 130 and to the base of the NPN transistor 140, whose emitter electrode is connected to ground. The collector electrode of the transistor is connected as a qualifying input to AND gates 20 to 23 of FIG. 1, the grounded state of the collector being the gate qualifying signal. The collector electrode is also connected to the cathode of diode 141 whose anode is connected to the junction between resistors 142 and 143. In the circuit, the grounding of the collector electrode of transistor 140 completes the path to ground for AND gates 20 to 23 whereby these gates are qualified. Hence, even though the ignition switch is open, positive bias at the base of transistor 140 renders that transistor conductive and the AND gates will be qualified. Subsequently, ignition switch 33 is closed. It will be remembered that when this ignition switch is initially closed, the control channels of FIG. 1 will generate control signals which will proceed through the now opened gates to the modulators. Additionally, current will flow from the A+ source through resistor 111 into capacitor 112, whose other end is grounded. Current will also flow from the A+ source through the voltage divider comprised of resistors 121 and 122 serially connected. A PNP transistor 125 has its emitter electrode connected to the junction between resistors 121 and 122 and its collector electrode connected to ground through resistors 142 and 143, respectively, which latter resistors are serially connected. A resistor 119 connects the base electrode of transistor 125 to other end of resistor 121.

Switches 95 and 115, which are located in modulators 29 and 30 respectively and sense movement of their diaphragms, are open so long as the diaphragms do not move. Switch 95 is connected in series with resistor 116 between the base electrode of transistor 125 and ground while switch 115 is connected in series with resistor 117 across the same points. The values of resistors 119, 121 and 122 are such that if switch 33 is closed, transistor 125 remains nonconductive so long as both switches 95 and 115 remain open. When either switch closes, indicating that its associated diaphragm has moved, transistor 125 is rendered conductive, thus energizing its collector electrode. This latter collector electrode is connected to the anode of diode 126 whose cathode is connected to the emitter electrode of PNP transistor 128 whose base electrode is connected to the junction between resistor 111 and capacitor 112.

Immediately after the closing of switch 33 the transistor 128 base electrode voltage is low since capacitor 112 has not fully charged through resistor 111. Thus transistor 128 now turns on and supplies the resultant voltage at its collector electrode through resistor 137 to base electrode of transistor 133, whose emitter electrode is connected to ground and whose collector electrode is connected to the base electrode of transistor 140. This latter transistor is thereby rendered conductive, immediately grounding its collector electrode and hence the base electrode of transistor 140 to turn off that transistor. The voltage at the collector electrode of transistor 140 accordingly now rises to extinguish the gate qualification signal there and to close AND gates 20 and 23 of FIG. 1. Referring back to that figure, with the AND gates now closed solenoid valves 29a and 29b and the corresponding solenoid valves of modulator 30 are deenergized thus closing solenoid valve 29a and opening solenoid valve 29b to thereby cause the modulator diaphragm to rapidly return to its normal position.

Returning again to FIG. 2, as capacitor 112 continues to charge, the voltage at the base electrode of transistor 128 eventually rises to the point where that transistor becomes nonconductive. This extinguishes the base drive of base electrode of transistor 133 to render that transistor nonconductive, thus removing the ground from the base electrode of transistor 140. Accordingly, the gate qualification signal of that transistor's collector electrode is reestablished to qualify AND gates 20 to 23. So long as ignition switch 33 remains closed, capacitor 112 will remain charged and transistors 128 and 133 remain nonconductive and ineffectual in the circuit.

If, however, after switch 33 is closed, neither modulator strokes so that its associated switch 95 or 115 does not close, transistor 125 will not become conductive and the false control signals will remain applied to the modulators during the entire period of those signals.

A slight and known delay time can be optionally built into the circuit or into the modulator switches to delay effectiveness of a switch actuation. This will permit the other switches in the circuit to operate, that is, will permit the other modulators to be exercised.

Figure 4:
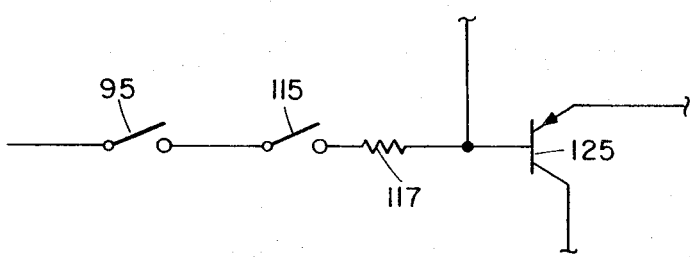
FIG. 4 is a partial schematic illustrating another form of the invention.

Another arrangement of the modulator switches, as seen in FIG. 4, reference to which should now be made, will insure that all modulators sensed will strobe before the false control signal is extinguished. In this latter figure it can be seen that switches 95 and 115 are serially connected with resistor 117 between the base electrode of transistor 125 and ground. In this form of the invention each switch must close, indicating that each sensed modulator has strobed, before transistor 125 is rendered conductive.

Returning to FIG. 2, a diode 110 is provided to shunt resistor 111 to permit capacitor 112 to discharge rapidly when ignition switch 33 is opened. A second diode 132 is provided to shunt the collector-emitter terminals of transistor 133 to suppress any voltage spikes generated at the cathode of that diode. Another diode 126 is provided between the emitter electrode of transistor 128 and the collector electrode of transistor 125 to prevent zenering at the base-emitter junction of transistor 128.

Other modifications and alterations of the invention are well within the understanding of those skilled in the art. For example, an adaptive braking system which did not inherently generate a false control signal at some stage in its operation can be provided with separate means to inject false vehicle parameter signals into its control channel input to excite the control channel to generate a false control signal. Also, where it is not desired to exercise the control channel the prior art has shown a separate circuit which generates a false control signal, without utilizing the control channel, when the vehicle power lines are energized. The invention is suitable with this type of exercising means also, as should now be obvious. Accordingly, the invention is limited only by the true scope and meaning of the appended claims.

The invention claimed is:

1. In an adaptive braking system for a wheeled vehicle including first means operable in response to a control signal for controlling wheel brake force and including actuating means automatically actuable in operating the vehicle for cycling said adaptive braking system in response to a false control signal, an improvement comprising:
   second means for sensing operation of said first means; and
   third means responsive to sensed operation of said first means for extinguishing said false control signal.

2. The improvement recited in claim 1 wherein said first means is a brake force modulator having physically moving elements for controlling wheel brake force and wherein said third means comprises switch means actuated in response to movement of said moving elements.

3. The improvement recited in claim 1 wherein said vehicle includes a vehicle braking system and means for generating a braking signal upon operation of said vehicle braking system and said adaptive braking system includes means responsive to said braking signal for communicating said control signal to said braking signal for interrupting communication of said control signal to said brake force modulator.

4. In an adaptive braking system for a wheeled vehicle having at least one electronic control channel for generating control signals in response to vehicle parameters and a brake pressure modulator responsive to said control signals for controlling brake pressure applied to a wheel and wherein initial electrical energization of said control channel results in the inherent generation of a false control signal without regard to said vehicle parameters, an improvement comprising:
   first means for sensing the response of said brake pressure modulator; and
   second means responsive to said sensed response during said initial electrical energization for extinguishing said false control signal.

5. The improvement recited in claim 4 wherein said vehicle includes an operator actuated wheel brake applicator and means responsive to operator actuation of said wheel brake applicator for generating a brake signal and with additionally means responsive to said brake signal for permitting response of said brake pressure modulator to said control signals.

6. The improvement recited in claim 4 wherein said vehicle includes a vehicle operator controlled wheel braking system and said brake pressure modulator when in a normal condition does not interrupt said vehicle operator controlled wheel braking system and said brake pressure modulator when responsive to a control signal interrupts said vehicle operator controlled wheel braking system and wherein said second means comprises means responsive to said sensed response during said initial electrical energization for extinguishing said false control signal and for providing rapid return of said brake pressure modulator to its said normal condition.

7. In an adaptive braking system for a wheeled vehicle having at least one control channel for generating control signals in response to vehicle parameters and a brake force modulator having a determinable response to control signals for controlling brake force applied to at least one wheel, an improvement comprising:
   means for generating false control signals without regard to actual said vehicle parameters; and
   means responsive to said false control signals for extinguishing said false control signals.

8. The improvement recited in claim 7 wherein said vehicle includes an operator actuated wheel brake applicator and means responsive to operator actuation of said wheel brake applicator for communicating said control signals to said brake force modulator.

9. The improvement recited in claim 8 wherein said vehicle includes a fluid braking system, said brake force modulator being a fluid pressure modulator having members movable out of a normal position for relieving fluid pressure at the vehicle brakes and which when in a normal position do not modulate the fluid pressure, said determinable response being the movement of said members from said normal position, said means responsive to false control signals being means responsive to said movement.

10. The improvement recited in claim 7 wherein said vehicle includes an ignition switch turned to an on position for energizing said vehicle's electrical circuits, said means for triggering being responsive to initial energization of said electrical circuits for generating said false control signal.

11. The improvement recited in claim 7 wherein said means for generating a false control signal comprises means associated with each brake force modulator for generating said false control signals.

12. The improvement recited in claim 7 wherein said means for extinguishing said false control signals comprises:
   means associated with each said modulator for sensing said determinable response; and
   means responsive, during the occurrence of said false control signals, to said sensed response for extinguishing said false control signals.

13. The improvement recited in claim 12 with additionally means for communicating said false control signals to said modulators and wherein said means for extinguishing comprises means responsive to said sensed response for disabling said communicating means.

14. The improvement recited in claim 11 wherein said means for extinguishing said false control signals comprises:
   means for generating a first signal upon response of any said modulator to a false control signal; and
   means responsive to said first signal for extinguishing said false control signals.

15. The improvement recited in claim 11 wherein said means for extinguishing said false control signals comprises:
   means for generating a first signal upon response of any said modulator to false control signals; and
   means responsive to said first signal for extinguishing said false control signal.

16. The improvement recited in claim 7 wherein said means for extinguishing said false control signals comprises:
   means for sensing said determinable response; and
   means responsive to said sensed response for extinguishing said false control signals.

17. In an adaptive braking system for a wheeled vehicle having a braking force modulator for automatically controlling vehicle braking in response to a control signal, means for automatically cycling said adaptive braking system comprising:
   means automatically actuable in operating the vehicle for generating a false control signal, said braking force modulator being additionally responsive to said false control signal; and
   means sensing the response of said braking force modulator to said false control signal for extinguishing said false control signal.

References Cited

UNITED STATES PATENTS 3,516,715   6/1970   Fielek, Jr. et al. ____ 303—21 AF

SAMUEL F. COLEMAN, Primary Examiner